United States Patent [19]

Jelinek

[11] Patent Number: 4,625,978
[45] Date of Patent: Dec. 2, 1986

[54] LOW TEMPERATURE SEAL

[75] Inventor: Jerry G. Jelinek, La Habra, Calif.

[73] Assignee: Parker Hannifin Corporation, Cleveland, Ohio

[21] Appl. No.: 736,152

[22] Filed: May 20, 1985

[51] Int. Cl.4 .............................................. F16J 15/10
[52] U.S. Cl. .............................. 277/180; 277/207 R; 277/235 R; 277/235 B
[58] Field of Search ............ 277/12, 152, 180, 207 R, 277/70, 214, 235 R

[56] References Cited

U.S. PATENT DOCUMENTS

| | | | |
|---|---|---|---|
| 2,949,325 | 8/1960 | Nenzell | 277/207 R |
| 3,462,161 | 8/1969 | Daubenberger et al. | 277/180 X |
| 3,910,587 | 10/1975 | Loeffler et al. | 277/70 X |
| 4,254,960 | 3/1981 | Jelinek | 277/152 X |
| 4,516,784 | 5/1985 | Merz | 277/180 |
| 4,535,996 | 8/1985 | Cardis et al. | 277/180 X |

FOREIGN PATENT DOCUMENTS 851627 10/1960 United Kingdom ................ 277/180

Primary Examiner—Allan N. Shoap
Attorney, Agent, or Firm—Joseph B. Balazs

[57] ABSTRACT

A low temperature static seal assembly consisting of an elastomeric seal element combined in a gland having a reduced wall dimension at the high pressure side which provides a path for enhanced communication between the seal element and the viscous fluid. O-ring, lathe-cut and molded in place seals can be accommodated in this configuration.

8 Claims, 5 Drawing Figures

LOW TEMPERATURE SEAL

BACKGROUND OF INVENTION

This invention relates generally to low temperature static seals and more particularly to a seal assembly having an elastomeric seal element wherein the assembly includes a pathway in the seal gland for enhancing fluid pressure communication with the seal element.

Static elastomeric seals, particularly those of the molded in place variety are very effective sealing devices. However, at sub zero temperatures, and more particularly in the range below −40° F., the elastomer can become quite stiff. The geometry of the typical static seal is such that the groove, gland or confining retainer usually provides an intimate faying contact with the mating structure which may be a plate surface, flange face, cylindrical shell or the like. Therefore, it is often difficult for the contained fluid, which itself can be quite viscous at the low temperature, to flow through the extremely narrow gap between these mating surfaces and force the stiff elastomeric seal to move in vector-like fashion to effect the characteristic wedge-like sealing action.

Consequently, it is not unusual for the contained fluid to seep past the stiff, contracted seal crown interface with the mating surface, especially if pressure impulses are applied in cycles. This nuisance type seepage usually stops as the pressurized system warms up to a point where the elastomer regains its flexibility and expands sufficiently to reseat itself. This parameter is sometimes referred to as the TR-10 level of the compound.

SUMMARY OF THE INVENTION

The invention deals with a geometric treatment of the seal retainer or gland to facilitate a continuous ingress of the fluid intimately against the elastomeric sealing member. By this expedient, the fluid is now situated in a position to exert an immediate, more favorable force vector, or pressure assist, on a much larger, exposed surface area of the stiff sealing member. This intimate action of the fluid is spontaneously harnessed wherever the fluid is pressurized to force the sealing member to move in immediate response, reseating and wedging itself against the low pressure side of its retainer. This results in the normal shut-off against any seepage or leakage, even at low temperatures.

The invention can be applied not only for molded in place elastomeric seals, but also for other elastomeric shapes, for example of the o-ring or square cut variety, that are situated in close fitting grooves or glands. Essentially, the invention comprises providing a "relief" at the high pressure side of the gland or groove to facilitate fluid ingress at low temperatures. This relief may consist of appropriate notches or channels to suit a variety of design options but preferably is a continuous pathway at the high pressure side of the gland, resulting from a reduced wall dimension for that side of the gland.

As depicted, the invention comprises a dual sided, port sealing plate retainer having oppositely disposed molded in place elastomeric seal elements. The full periphery of the inner wall of the seal groove is recessed from the typical dimension of the outer wall to provide a continuous path of communication between the central port opening and the sealing element. However, a similar result could be obtained if the path were discontinuous or otherwise configured. As noted, the invention can be applied to other seal configurations, such as o-ring or lathe-cuts, or could be applied in a reversed manner for sealing a central vacuum, for example. While particularly suited for face type seals in a planar configuration, it is also suitable for sealing cylindrical surfaces or stepped shape configurations. An additional advantage of the invention is that it is effective in relieving occluded fluids that are trapped beneath the seal as it is deflected during closure.

DETAILED DESCRIPTION OF THE INVENTION

Figure 4:
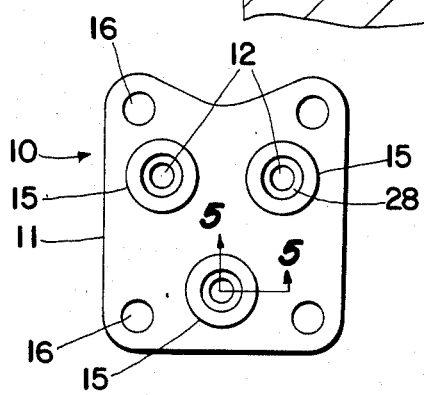
FIG. 4 is a plan view of the port sealing plate configured according to this invention.

Referring now to the drawings and initially to FIG. 4, there is shown a port sealing plate 10 which consists of retainer 11 having three identical port openings 12 therein, each sealed by an identical elastomeric seal element 15. Retainer 11 is generally a rectangular plate and includes fastener opening 16 at each corner thereof for securing the retainer in a sealed joint.

Figure 2:
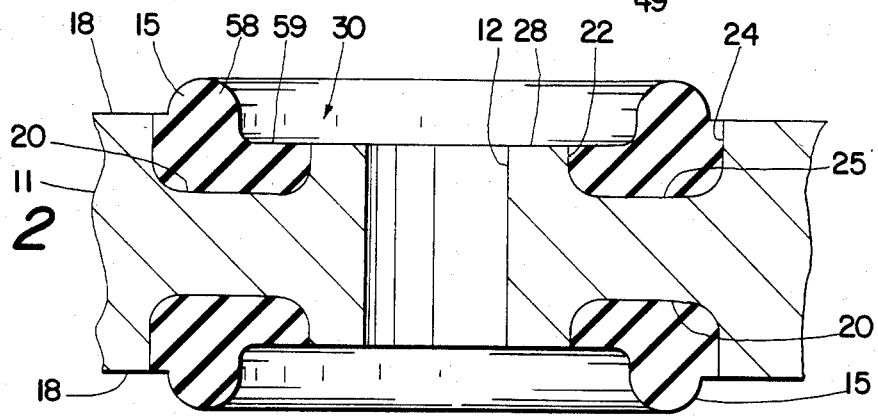
FIG. 2 is an enlarged view in section of part of a port sealing plate having a retainer and molded in place seal configured according to this invention.
Figure 5:
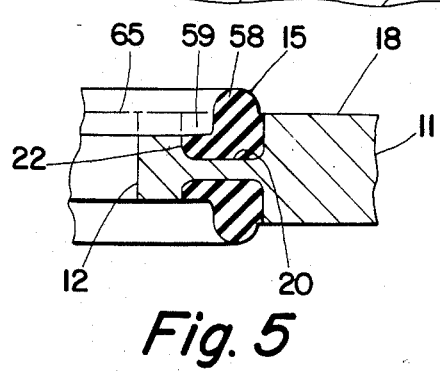
FIG. 5 is a sectional view of the port sealing plate of FIG. 4, takes along the lines 5—5.

As seen in section in FIG. 5 and in enlarged detail in FIG. 2, retainer 11 comprises a metal plate having substantially parallel opposed surfaces 18, each of which includes a groove 20 containing a seal element 15. The grooves 20 and seals 15 are circular, embedded in the faces of surfaces 18 and surrounding port opening 12. Since the grooves 20 and seals 15 on the opposed surfaces 18 are identical only the upper ones will be described in detail. It will be understood that retainer 11 could be configured otherwise, as well, with seals on only one surface 18 thereof or with modifications to one or more of the sealing configurations, as each seal 15 is substantially independent of the others.

Groove 20 comprises inner wall 22, outer wall 24 and interconnecting bottom wall 25, the latter being a ring lying in a plane substantially parallel to the plane of retainer surface 18. Inner and outer walls 22, 24 are generally parallel, cylindrical surfaces, extending transversely of retainer surface 18 and intersecting bottom wall 25 in a smooth transition. Outer wall 24 terminates at its upper end at retainer surface 18 while inner wall 22 is recessed from surface 18 and terminates at its upper end at pressure surface 28. In this embodiment of the invention pressure surface 28 is a flat, annular ring surface lying in a plane substantially parallel to the plane of retainer surface 18 and interconnecting inner wall 22 of groove 20 with port opening 12, the latter being a transverse, cylindrical bore through retainer 11. Thus, it will be apparent that recessed inner wall 22 and pressure surface 28 provide a path 30 for fluid communication between port opening 12 and groove 20 and the seal element 15 contained therein.

Figure 1:
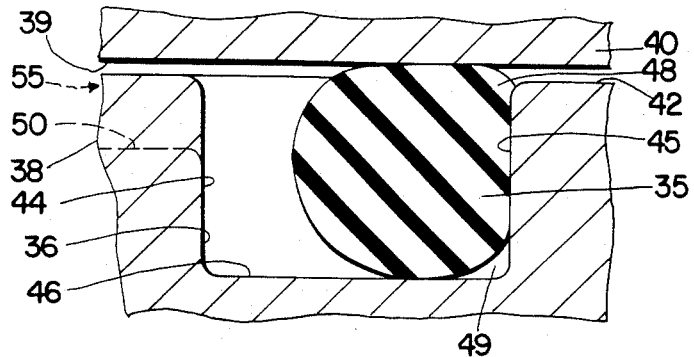
FIG. 1 is a view in section of part of the gland of a prior art face seal joint containing an o-ring seal.

Referring now to FIG. 1, there is shown a prior art embodiment of a sealed joint having an o-ring 35 disposed in a typical gland 36 of body member 38 adapted for sealing engagement with mating surface 39 of a complementary body 40. Gland 36 is formed in the upper planar surface 42 of body 38 in a typical face seal configuration with inner gland wall 44 and outer gland wall 45 intersecting gland bottom wall 46. The space between surfaces 39, 42 at the inner and outer gland walls 44, 45 is a close faying contact determined primarily by the smoothness of the surface 39, 42 to be sealed, a selected desired spacing or various other considerations depending upon the sealing environment. The spaces may be minute, however, they are shown enlarged for purposes of describing the action of o-ring seal 35 disposed in gland 36.

In this prior art showing, gland 36 is pressurized from the side of inner wall 44 by way of the gap between surfaces 39, 42 to move o-ring 35 against outer wall 45 and into further seating engagement with surface 39 and gland bottom wall 46. O-ring 35 may be considered an incompressible viscous fluid having a very high surface tension and is deformed in part into gland 36 by means of mechanical pressure from body member 40, but also toward or into the gap at outer wall 45 by means of the hydraulic pressure. Bulge 48 is shown in o-ring 35, filling the gap and this is what creates the seal between the body members 38, 40. FIG. 1 also depicts a void 49 at the intersection of outer wall 45 and bottom wall 46 which is sealed as well by o-ring 35 in engagement with the respective walls. Occluded fluids can be trapped beneath the seal in void 49 and it is an advantage of the instant invention that such fluids can be substantially relieved due to increased pressure applied at the o-ring 35.

At very low temperatures, the gap between surfaces 39, 42 at inner wall 44 is so small and the applied fluid under pressure and the o-ring itself, so viscous, that the sealing condition depicted in FIG. 1 cannot occur reliably. That is, insufficient fluid under pressure is applied to gland 36 to adequately energize o-ring 35 and consequently fluid will leak through the interface between o-ring 35 and surface 39 of body member 40, outwardly of outer gland wall 45. However, if inner wall 44 is relieved from the dimension of surface 42 to that relieved surface depicted by dashed line 50, then an enlarged path 55 is provided between the relieved surface 40 and body surface 39 to allow improved communication between the fluid under pressure and the o-ring seal 35. While the dimension of path 55 is dependent upon many parameters and any substantial relief of inner wall 44 would provide improvement, worthwhile improvement occurs when path 55 is on the order of several times the volume as that volume provided between closely spaced typical surfaces 39, 40. By volume is meant that space forming path 55 between surfaces 39, 50 throughout the radial width of inner wall 44. As noted inner wall 44 could be relieved in different configurations rather than continuously throughout its periphery, as indicated. For example, the path 55 could be interrupted with notches or channels to suit a variety of design options. Since it is the volume of path 55 which is significant, such changes would affect as well, the size of the relief of inner wall 44 in the dimension of the depth of gland 36.

Referring again to the seal assembly of FIG. 2, in this arrangement seal element 15 is a molded in place seal and may be bonded into the groove 20 of retainer 11. Seal 15 comprises a crown portion 58 and adjacent recess portion 59 each extending approximately one-half the radial width of groove 20, as seen in section. This is characteristic of one type of molded in place seal wherein the recess 59 is provided for controlled deformation of crown 58 upon mechanical distortion of seal 15.

Figure 3:
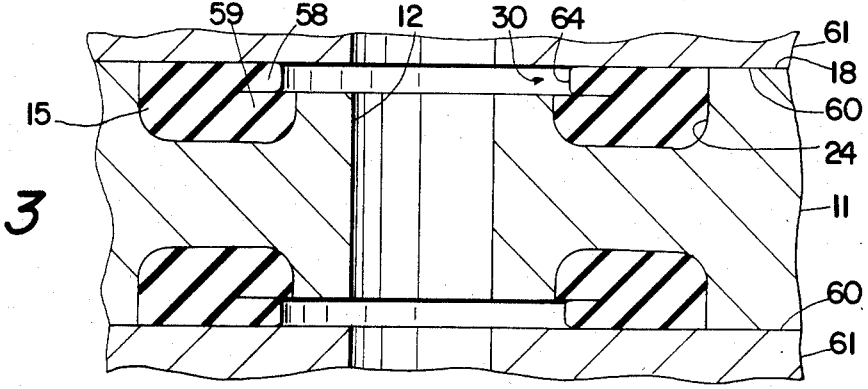
FIG. 3 is a view in section of part of a fluid joint sealed with the port sealing plate of FIG. 2.

In FIG. 3, such distortion of seal 15 is indicated where retainer 11 is assembled as part of a joint between the mating surfaces 60 of adjacent structures 61. Here surface 18 of retainer 11 is shown in close engagement with surface 60. Crown 58 which had projected above surface 18 by an amount somewhat less than the volume of the space of recess 59 is distorted by surface 60 over and into recess 59 in an on-lying configuration. In this arrangement, crown 58 provides a fairly substantial exposed surface 64 which is generally cylindrical in configuration and which is exposed to the fluid under pressure in port opening 12 by way of path 30. In the joint of FIG. 2, path 30 is further defined by mating surface 60 of the adjacent structure 61. Seal 15 is thus forced and urged toward outer wall 24 in a vector-like fashion to effect the characteristic sealing action.

With reference to the sectional showing of FIG. 5, imaginary line 65 is drawn to represent a continuation in the same plane of surface 18 of retainer 11 in order to define the conventional volume of groove 20 therein. Inner wall 22 is continued as well to join surface 65 to further define the groove 20 volume. Thus groove 20 volume is the torous defined by outer wall 24, groove bottom 25, inner wall 22, extended to surface 65, and contained beneath the surfaces 18, 65. As noted, the molded in place seal 15 includes a recess 59 defined in such groove volume which is sufficient to accommodate distortion of the seal crown 58 thereby achieving a preferred sealing engagement when mating surfaces are joined.

I claim:

1. An elastomeric seal assembly for low temperature, static sealing applications, comprising a body member having a sealing surface and an annular groove therein, said sealing surface adapted for intimate faying contact with the conforming surface of a stationary mating member, said annular groove surrounding an opening in said body member, which said opening is exposed to fluid under pressure to be sealed, annular elastomeric seal means in said groove adapted for fluid sealing engagement with said conforming surface of said mating member, said seal means projecting from said groove beyond said sealing surface and adapted for deformation by said mating member, first and second annular walls in said body member defining the sides of said groove, said walls being spaced from one another in a direction from said opening so that one of said walls is closer to said opening, said first wall being disposed at a high pressure side and said second wall disposed at a low pressure side, said second wall being continuous and extending to said sealing surface, said first wall extending to a second surface recessed from said sealing surface thereby to provide a path to said groove for fluid communication and pressurization of said seal therein from the opening, said seal comprising a projecting seal portion and adjacent recessed seal portion, said projecting seal portion being positioned adjacent said second wall and adapted for deformation by said mating member toward said recessed seal portion, said recessed seal portion being adjacent said second surface.

2. The seal assembly set forth in claim 1 wherein said seal means is an o-ring seal.

3. The seal assembly set forth in claim 1 wherein said seal means is molded in place seal bonded to said body member.

4. The seal assembly set forth in any one of claims 1, 2 or 3 wherein said groove walls are equilaterally spaced.

5. The seal assembly set forth in any one of claims 1, 2 or 3 wherein said groove walls are cylindrical and parallel.

6. The seal assembly set forth in any one of claims 1, 2 or 3 wherein said second surface is a continuous planar ring surface.

7. The seal assembly set forth in any one of claims 1, 2 or 3 wherein said body member is planar and is adpated to be joined with a mating planar surface.

8. The seal assembly set forth in any one of claims 1, 2 or 3 wherein said seal assembly is a retainer adapted for positioning between adjacent mating surfaces and further comprises a second sealing surface having second groove and second seal means therein, said sealing surfaces being on opposite sides of said body member.

* * * * *